(12) United States Patent
Lucy et al.

(10) Patent No.: US 11,507,674 B2
(45) Date of Patent: Nov. 22, 2022

(54) QUANTIFYING PRIVACY IMPACT

(71) Applicant: Microsoft Technology Licensing, LLC, Redmond, WA (US)

(72) Inventors: Kimberly Denise Lucy, Woodinville, WA (US); Samuel Terrence Trim, Sammamish, WA (US); Nicholas Gregg Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 16/550,072

(22) Filed: Aug. 23, 2019

(65) Prior Publication Data

US 2021/0056213 A1 Feb. 25, 2021

(51) Int. Cl.
*G06F 3/048* (2013.01)
*G06F 21/60* (2013.01)
*G06F 3/04842* (2022.01)

(52) U.S. Cl.
CPC ............ *G06F 21/604* (2013.01); *G06F 3/048* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 9,691,090 | B1 | 6/2017 | Barday |
| 2008/0288330 | A1* | 11/2008 | Hildebrand ...... G06Q 10/06398 705/7.42 |
| 2010/0275263 | A1* | 10/2010 | Bennett ................. G06F 21/577 726/25 |
| 2013/0239177 | A1* | 9/2013 | Sigurdson ........... H04L 63/1433 726/4 |
| 2014/0278730 | A1* | 9/2014 | Muhart .............. G06Q 10/0635 705/7.28 |
| 2016/0188883 | A1* | 6/2016 | Wang .................... G06F 21/577 726/25 |
| 2018/0200575 | A1* | 7/2018 | Nagaishi ................. A63B 69/38 |
| 2018/0330100 | A1* | 11/2018 | Bar Joseph ........... G06F 21/577 |
| 2019/0266353 | A1* | 8/2019 | Gkoulalas-Divanis ...................... G06F 21/6254 |

OTHER PUBLICATIONS

"Guidelines on Data Protection Impact Assessment (DPIA)", In Guidelines of Article 29 Data Protection Working Party, wp248rev. 01, Oct. 13, 2017, 22 Pages.
"Information Technology—Security Techniques—Information Security Risk Management", In International Standard, ISO/IEC JTC 1/SC 27 N17973, Reference No. ISO/IEC FDIS 27005:2018(E), Apr. 12, 2018, 67 Pages.
"International Search Report and Written Opinion Issued in PCT Application No. PCT/US2020/039407", dated Aug. 10, 2020, 13 Pages.

* cited by examiner

*Primary Examiner* — Xuyang Xia
(74) *Attorney, Agent, or Firm* — Rainier Patents, P.S.

(57) ABSTRACT

This document relates to evaluating privacy impact for organization risk management. For example, quantifiable methods are provided by way of a privacy impact model to calculate a relative value for privacy impact can be used to calculate risk and prioritize risk mitigations and take corrective actions.

20 Claims, 4 Drawing Sheets

QUANTIFYING PRIVACY IMPACT

BACKGROUND

Within organizations throughout the world, information security risk management has become increasingly important, and is an integral part of all information security activities Information security risk management activities consider external and internal context, identify and assess the risks associated, and treat the risks using a risk treatment plan to implement the recommendations and decisions determined based on the organization's acceptable levels of risk. Part of successfully analyzing the information security risks posed to an organization is to determine the impact (consequence) on the organization of a potential adverse event. Such impact determination is well-understood within the information security risk management process, and can include financial, reputational, and legal impacts among others.

However, while such organizations may undertake detailed information security risk management, in many instances, the organizations may not have the capability to precisely determine privacy impact to individuals and thus miss a key aspect of privacy risk management. For example, software or a service produced by the organization may collect personal information from a user of the software/service, but the organization may lack any quantifiable methods for evaluating the impact to the user of collecting such personal information.

As such, while organizations typically focus on information security risk, there remain difficulties in quantifying privacy impact, necessary to determine risk, for such organizations that can be used to prioritize risk mitigations and corrective actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for quantifying privacy impact. One example includes a system that includes a processor and a computer-readable storage medium storing instructions that, when executed by the processor, cause the system to receive metadata representing privacy data from a data source, process, with a privacy model, the metadata to determine a privacy impact score associated with the data source, and generate a visual report depicting the privacy impact score on a user interface of the system.

Another example includes a method or technique that can be performed on a computing device. The method can include extracting metadata representing privacy data utilized by a data source from a database, the metadata defining data types, data uses of the data types, and de-identification levels of the data types. The method can further include calculating a privacy impact score based at least on the metadata, binning the data source into privacy rating bins according to the calculated privacy impact score, and displaying on a graphical user interface visual depictions of the calculated privacy impact score according to the privacy rating bins.

Another example includes a system that includes a display of the system configured to depict a graphical user interface, a processor, and a storage memory storing computer-readable instructions, which when executed by the processor, cause the processor to display, via the graphical user interface, data associated with privacy ratings for one or more data sources, receive a selection of at least one plot point representing a privacy impact score on the graphical user interface, determine whether a modification to metadata associated with the privacy impact score results in a reduction of the privacy impact score, and display a recommendation on the graphical user interface concerning the modification.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
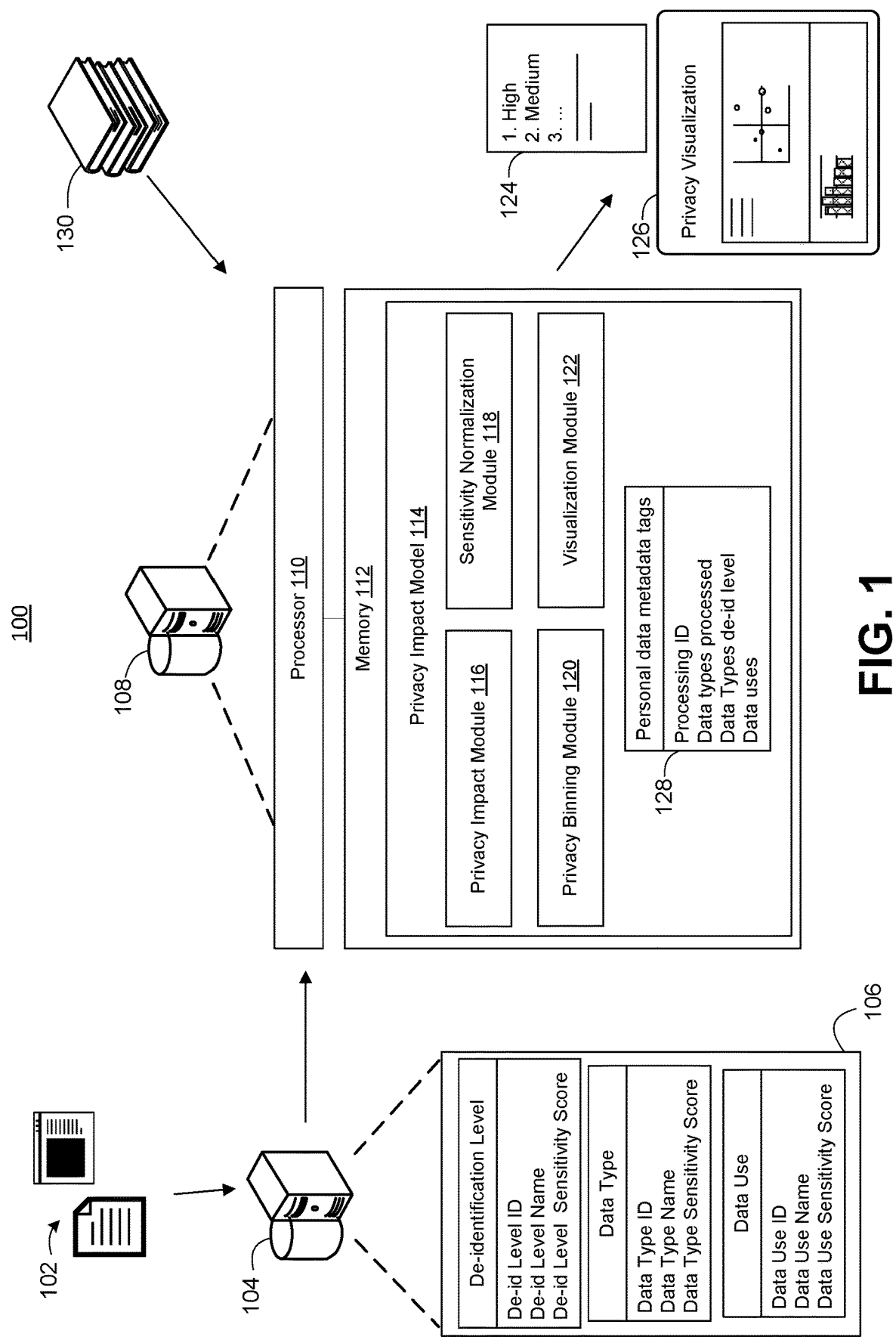
FIG. 1 illustrates an example system that is consistent with some implementations of the present concepts.

There is a growing interest in addressing the difference between information security risk management and privacy risk management. Information security risk management and related risk assessments can be typically focused on risk to an organization, where such organizations can use various methods to assign relative values to impacts and likelihoods, and can then calculate a relative value for organizational risk that can be used to prioritize risk mitigations and corrective actions. That is, typically information security risk management is focused on the organization and general techniques for reducing risk for the organization.

In contrast, privacy assessments by organizations typically are focused on impacts to individuals, such as those risks identified through a Privacy Impact Assessment (PIA). A PIA is a type of impact assessment conducted by an organization (typically, a government agency or corporation with access to a large amount of sensitive, private data about individuals in or flowing through its system). The organization can audit its own processes and sees how these processes affect or might compromise the privacy of the individuals whose data it holds, collects, or processes. Typically, a PIA is designed to ensure conformance with applicable legal, regulatory, and policy requirements for privacy, determine the risks and effects, and evaluate protections and alternative processes to mitigate potential privacy risks.

In large organizations, however, there can be numerous PIAs in use at any one time, and performing a detailed analysis by hand of the numerous assessments for potential problems and determining mitigation results for those problems can be difficult and time-burdensome. Moreover, for such large organizations, the amount of data collected and retained may be too large to adequately process by a privacy team, and as such, certain privacy considerations or determinations may be unexpectedly missed. Finally, a PIA can often prioritize an individual's privacy concerns over privacy concerns associated with the organization. As such, there is a need to consider individuals' privacy impacts as a function of overall organizational risk in an efficient manner. As set forth below, a computerized privacy impact framework can provide a technical solution to the above issues by utilizing a privacy impact model to weight certain data, such as the data associated with PIAs, as part of calculating overall organizational privacy risk in a manner that can be efficient for the organization.

An example formula that is often used for calculating risk is Risk=Impact x Likelihood, where Impact is the impact to the business and Likelihood is the likelihood that the risk may occur. This calculation can be used to help provide a qualitative view for organizations to help determine what their risk posture and highest priority risks are. A more specific formula that can be used for security-specific risk assessments is Risk=Threat×Vulnerability×Impact, where the combination of threat and vulnerability are similar to Likelihood in the simple formula. More complex formulas may include calculations for risk mitigations as well, or assign numerical values based on the organization's specific context so that risk ratings can be quantified.

However, the privacy impact to an individual can be significantly different than the concept of a security impact to an organization. ISO/IEC 27005, which provides information security risk management guidance for organizations, specifies that impact criteria should be developed and specified in terms of the degree of damage or costs to the organization caused by an information security event. For data protection and privacy, impact criteria may need to look beyond the impact to the organization, and the impact to an individual's privacy can be considered in addition to the impact to an organization. Moreover, whereas security impact can be determined subjectively by an organization, privacy impact to an individual can involve a more objective approach. In order to sufficiently integrate impact to individuals into overall organization privacy and data protection risk, a privacy impact framework that utilizes a tunable privacy impact model can establish a quantifiable or qualifiable way to measure potential privacy impact.

While certain standards, such as ISO/IEC 29134, can provide guidance for estimating level of impact, such standards tend to only analyze one dimension of the data, namely the nature of the personally identifiable information (PII) that is being used. PII typically refers to information that can be used to distinguish or trace an individual's identity, either alone or when combined with other personal or identifying information that is linked or linkable to a specific individual. However, in certain instances, types of PII that are being used may not present sufficient privacy risks when the overall context of the usage is considered in connection with an organization's overall risk. As such, additional and more nuanced criteria can be utilized that may enhance accuracy and specificity of privacy impact measurements, and can lead to more fine-grained risk assessments at an organizational level, thereby providing a technical solution to the difficulties of privacy risk analysis within a large organization.

A starting basis for enhancing accuracy of privacy impact measurements can be via a privacy impact model that can utilize taxonomies for data types and data uses, where the taxonomies may be used to classify data into categories and subcategories. The various taxonomies used in the model can be assigned tunable weights, based on a particular organization's risk considerations, as well as the regulatory and legal environment in which the organization operates. Using these taxonomies, along with additional criteria such as de-identification levels of data, can allow organizations to obtain a better idea of how specific data processing activities might impact an individual and the organization overall, by considering potential privacy impact as a function of multiple factors.

Methodological techniques can therefore be provided that analyzes the use of data in a system, such as the data types involved in processing, the specific use of data, and any de-identification levels associated with the data, such as through the taxonomic descriptions of the data. This data analysis can provide a framework for more objectively assessing and quantifying privacy impact of a software service or a set of data in a computing context by way of the privacy impact model.

As such, the system disclosed herein can provide a systematic technological approach to privacy risk management by use of an effective privacy impact model, which can be used to identify organizational needs regarding personal data protection requirements. The system can be suitable for a specific organization's environment and can be configured with appropriate privacy weightings for evaluation of data, so that the privacy impact evaluations are aligned with the organization's overall enterprise risk management, while providing an objective determination regarding an individual's privacy risk.

Example System

FIG. 1 depicts an example system 100 for performing privacy risk management for an organization. As depicted in FIG. 1, one or more data sources 102 can be received by data processor 104, which may perform parsing of the data sources to identify metadata that describes particular data types and associated uses within the data sources. Data processor 104 may further include a database that can store a collection of data parsed from data sources 102, such as for allowing analysis of existing data over periods of time to determine privacy impact to an organization. For example, a user can determine whether privacy risk has increased due to the continued collection of certain data, which may involve accessing historical data stored within the database of data processor 104.

Data sources 102 can be, for example, manually created PIAs, which can be fed into data processor 104 for parsing to extract privacy information and data usage as specified by the PIA. Alternatively, in one implementation, data sources 102 may also include software applications or software code that can be fed into data processor 104, where the software may be parsed to extract privacy information and data usage associated with the software. In another implementation, data sources 102 may include information that can be input via a graphical user interface presented on a webpage or other such software located on the Internet or an Intranet that can be communicatively coupled to data processor 104, where an end user may input certain data types and their associated uses on the graphical user interface.

For example, the graphical user interface may allow a user to select particular taxonomic data types and taxonomic data uses from drop menus of commonly used data types and uses within the organization. In such an implementation, the dropdown menus of the graphical user interface can be automatically populated with certain data types and/or data uses that the organization finds of particular importance, rather than allowing selection of all data types. For example, a privacy officer associated with the organization may pre-select certain data types and/or data uses, and the graphical user interface may filter the dropdown menus to only allow selection of the pre-selected data, which can assist in avoiding errors in the privacy review process introduced by including data that need not be considered as part of the review.

Upon being received by data processor 104, the data sources may be parsed to extract various types of information, and in one implementation, data processor 104 may extract metadata associated with a project 106. For example, project 106 may be a software development project that is being developed by an organization, and the software may utilize certain data in general operation of the software. The extracted metadata may include a listing of data types that may be used by the project, data usage for those data types, and data de-identification levels associated with the data types.

In one implementation, the data types extracted by data processor 104 may be a taxonomy of data types that are commonly used throughout the organization, and can be based on ISO/IEC 19944 data types. For example, such data types may be data reflecting user name, user location, telemetry, account data, etc. Similarly, the data usage may be a taxonomy of data uses that can also be based on ISO/IEC 19944, which may be used throughout the organization. For example, such data usages may be used in marketing, used in advertising, training examples for AI/machine learning, etc. Finally, the data de-identification levels can provide, for the data type being used according to the data usage, whether any de-identification has been applied to the data, such as pseudonymized, anonymized, etc.

Each of the data types, data usages, and data de-identification levels may have an associated identifier, name, and privacy sensitivity score, which can provide a base score reflecting a privacy level associated with the particular type of data. For example, a data type may be PII such as a "Name" type of data, and the data usage associated with this data type may specify that the "Name" data is being used by software to display a welcome message to a user, using the user's personal name. In this context, the privacy sensitivity score may be low, due to the basic usage of the PII, and would likely not present a major privacy impact to the individual or to the organization if such PII was made public.

However, in other situations, the data type may be PII such as "Social Security Number," which a software application may use to certify a user for validation purposes, as reflected by the data usage. In this instance, the privacy sensitivity score associated with this particular PII, in this data usage context, may be high, as the PII can be considered very sensitive data that can be potentially damaging to both the individual and the organization as a whole if it were released to the public. Additionally, in some instances, a combination of a "Social Security Number" data type, in combination with a "Name" data type, may exhibit an extreme privacy sensitivity score, as the combination of the two data types can be highly damaging if made public.

It is to be appreciated that the information extracted by data processor 104 may include other types of data, such as an age for the data, a population size of a dataset, a population diversity of the dataset, how often the data is collected and/or refreshed, etc. This additional data can be used to provide additional refinement to the privacy calculation. For example, having a very large population of data stored within data processor 104 may create a larger overall impact to the organization, as a potential hacker could potentially reidentify anonymized data given the size of the population of data. As such, the privacy impact score may be increased if the model determines that certain types of data have a large population.

Upon extracting the data associated with project 106, data processor 104 may transmit the extracted data to a privacy rating device 108. Privacy rating device 108 can comprise a processor 110 and memory 112, and memory 112 may store a privacy impact model 114. The privacy impact model can be made of various software modules that can be executable by the processor 110 for use in analyzing data for privacy risk as part of the overall privacy model.

For example, privacy impact model 114 may include various modules, such as privacy impact module 116, sensitivity normalization module 118, privacy binning module 120, and visualization module 122. While the example system 100 illustrates the various modules as executing on privacy rating device 108, it is to be understood that all or portions of modules may alternatively execute on data processor 104. Furthermore, it is to be appreciated that either of data processor 104, or privacy rating device 108, may be remotely located and accessible via a network, such as being located on a cloud platform that provides the disclosed privacy analysis.

Memory 112 can include both persistent storage resources, such as magnetic or solid-state drives, and volatile storage, such as one or more random-access memory devices. In some cases, the modules described above are provided as executable instructions that are stored on persistent storage devices, loaded into the random-access memory (RAM), and read from RAM by processor 110 for execution.

Privacy impact model 114 can be used to calculate a privacy impact score for parsed data sources, where the privacy impact score may be associated solely with the parsed data source, or may take into account additional data that may be stored in, for example, a database associated with data processor 104. The calculation of the privacy impact score can be computed by the privacy impact module 116, in accordance with a process described with reference to FIG. 2.

Figure 2:
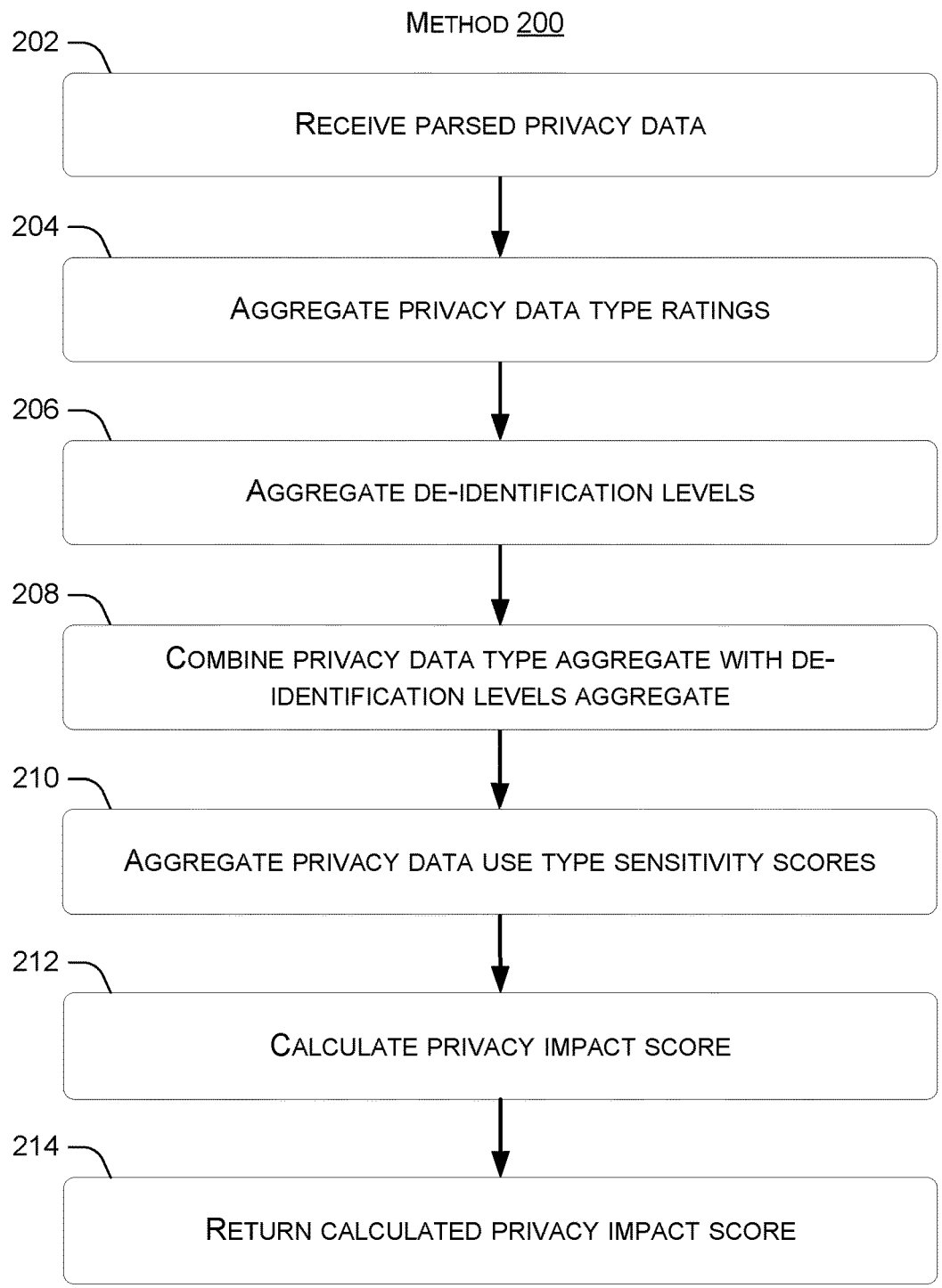
FIG. 2 illustrates an example method or technique that is consistent with some implementations of the present concepts.

FIG. 2 depicts an example processing method 200 which may be performed by privacy impact module 116, in accordance with one implementation. At step 202, the method may receive parsed privacy data, such as data from data processor 104, where the parsed data may contain data types, data uses, and data de-identification levels, along with their associated privacy sensitivity score values. At step 204, the method may aggregate the privacy data type ratings. That is, the sensitivity scores of the data types used throughout the program being analyzed can be aggregated to achieve an aggregate privacy data type rating. In the equations used in describing method 200, the following notations may apply:

DTR: Data Type Rating
DTRAgg: Data Type Rating Aggregate
ILR: De-Identification Level Rating
ILRAgg: De-Identification Level Aggregate
DTRTotalAgg: Data Type Total Aggregate
DUTSR: Data Use Type Sensitivity Rating
DUTSRAgg: Data Use Type Sensitivity Rating Aggregate
DPIR: Data Privacy Impact Rating Score
x: Single element of data set union
i: Current index in iterative sequence
n: Maximum count of elements in a collection
A: Left indexed dataset collection of assessments
B: Right indexed dataset collection of data type values In one implementation, the various data type ratings can be aggregated according to a summation of the rating values:

$$DTRAgg_i = \Sigma_{i=0}^{N}(DTRx_i)$$

where $\{x : x \in A \land x \in B\}$

Next, at step 206, the method may aggregate the sensitivity score values associated with the de-identification levels. Similarly, this aggregation can be performed according to a summation:

$$ILRAgg_i = \Sigma_{i=0}^{N}(ILRx_i)$$

where $\{x : x \in A \land x \in B\}$

At step 208, the method may combine the aggregated values corresponding to the data type rating and the de-identification levels, according to the following summation:

$$DTRTotalAgg_i = \Sigma_{i=0}^{N}(DTRAggx_i + ILRAggx_i)$$

where $\{x : x \in A \land x \in B\}$

At step 210, the method may aggregate the data use sensitivity scores, according to the following summation:

$$DUTSRAgg_i = \Sigma_{i=0}^{N}(DUTSRx_i)$$

where $\{x : x \in A \land x \in B\}$

At step 212, the privacy impact score can be calculated according to the values calculated during steps 204-210. Specifically, the data privacy impact score can be calculated according to:

$$\Sigma_{i=0}^{N^{DPIR}}{}_{i=}(\sqrt{(DTRTotalAggx_i - 0)^2 + (DUTSRAggx_i - 0^2)^2})$$

where $\{x : x \in A \land x \in B\}$

Finally, at step 214, the calculated privacy impact score can be returned by privacy impact module 116, such as for additional processing by the remaining modules of privacy impact model 114. One example technique for performing method 200 is included below as Table 1:

TABLE 1

```
--DPIA Privacy Data Type Aggregation
    TRUNCATE TABLE [dbo].[DPIAPrivacyDataTypeSummary]
    INSERT INTO [dbo].[DPIAPrivacyDataTypeSummary]
    SELECT dpi.Division, dtcr.DPIA, dtcr.DPIAReferenceId, SUM(PDTRating)
as PDTAggScore, SUM(ILRating) as ILAggScore, (SUM(PDTRating) +
SUM(ILRating)) as TotalAggScore, dpi.[View]
    FROM [XprCore].[dbo].[tmpDPIADataTypeCatalogRating] dtcr
    INNER JOIN XprCore.dbo.DPIAIndex dpi ON dpi.DPIAReferenceId =
dtcr.DPIAReferenceId
    GROUP BY dpi.Division, dtcr.DPIA, dtcr.DPIAReferenceID, dpi.[View]
    ORDER By dpi.Division DESC
--DPI Privacy Data Use Aggregation
    TRUNCATE TABLE [dbo].[DPIADataUseTypeSummary]
    INSERT INTO [dbo].[DPIADataUseTypeSummary]
    SELECT dpi.Division, duc.DPIA, duc.DPIAReferenceId,
SUM(dut.SensitivityRating) as TotalAggScore, dpi.[View]
    FROM XprCore.dbo.DPIADataUseCatalog duc
    INNER JOIN xprcore.dbo.DPIAIndex dpi ON dpi.DPIAReferenceId =
duc.DPIAReferenceId
    INNER JOIN xprCore.dbo.DPIADataUseType dut ON dut.DataUseId =
duc.DataUseTypeId
    GROUP BY dpi.Division, duc.DPIA, duc.DPIAReferenceId, dpi.[View]
--Compute DPIR for DataUse
    TRUNCATE TABLE dbo.DPIRDataUseScoreSummary
    INSERT INTO dbo.DPIRDataUseScoreSummary
    SELECT dpi.Division, dpi.DPIA, dpi.DPIAReferenceId, pdts.TotalAggScore
as PrivacyDataTypeSensitivityScore, duts.TotalAggScore as
DataUseTypeSensitivityScore,
    CAST(SQRT( ( SQUARE(pdts.TotalAggScore) +
SQUARE(duts.TotalAggScore) ) ) as bigint) as DPIRDataUseScore
    FROM XprCore.dbo.DPIAIndex dpi
    INNER JOIN XprCore.[dbo].[DPIAPrivacyDataTypeSummary] pdts ON
pdts.DPIAReferenceId = dpi.DPIAReferenceId
    INNER JOIN XprCore.[dbo].[DPIADataUseTypeSummary] duts ON
duts.[DPIAReferenceId] = dpi.DPIAReferenceId
```

While Table 1 provides an example technique for performing method 200, it is to be appreciated that other example techniques are contemplated, such as via an alternate programming language.

Privacy impact module 116 may additionally include functionality to generate recommendations for minimizing the privacy impact for a service or project. For example, upon aggregating the data type and data use scores, privacy impact module 116 may determine that a reduced privacy impact score can be achieved by modifying some of the data used, such as by anonymizing a particular data type. Such anonymizing of the data may then result in a reduction of the sensitivity score associated with that data, and the overall privacy impact score may be lowered to within a threshold limit. Additionally, privacy impact module 116 could determine that a particular data type has too high of a sensitivity score, but an alternative data type may have a sufficiently low sensitivity score and could be used instead. In this instance, privacy impact module 116 could recommend that the data types in use be changed, in an overall effort to minimize the privacy impact score.

Referring again to FIG. 1, upon receiving the calculated privacy impact score, the model may process the privacy impact score by way of sensitivity normalization module 118, in an effort to ensure privacy scores are normalized with earlier data or previously calculated privacy impact scores, and to prevent aggregated values from exhibiting a zero horizon. In some implementations, sensitivity score values assigned to data, such as the sensitivity score values associated with project 106, may be assigned manually by, for example, a privacy officer of the organization or a subject matter expert. However, as there may be different ratings applied by different privacy officers or subject matter experts, a normalization process can be used to ensure that privacy impact scores reflect common sensitivity scoring.

A privacy binning module 120 can also be used to bin resulting privacy assessments into clusters of high, medium, and low dimensions, which can allow for easy grouping of rating results, and can also allow for alignment with other systems within the organizational environment. For example, a security risk management system may classify security risks into Critical/High, Medium, and Low risk categories, and as such, privacy binning module 120 can be used to similarly bin privacy risks into common dimensions so that privacy and security risk can be considered within common channels. One example technique for performing binning of the privacy assessments is included below as Table 2:

TABLE 2

```
CREATE FUNCTION [dbo].[GetDPIRUseScoreLabel](@inputscore bigint)
RETURNS NVARCHAR(16)
AS
BEGIN
DECLARE @Ceiling bigint
DECLARE @HighPointStart bigint
DECLARE @MidPointStart bigint
DECLARE @Label NVARCHAR(16)
SET @Ceiling = (SELECT MAX(DPIRDataUseScore) FROM
XprCore.[dbo].[DPIRDataUseScoreSummary]);
SET @HighPointStart = CAST (((@Ceiling * 0.667) as bigint)
SET @MidPointStart = @Ceiling / 3
SET @Label = ' '
IF @inputscore > @HighPointStart
--SET @Label = 'High'
RETURN ('High')
IF @inputscore > @MidPointStart AND @inputscore < @Ceiling
--SET @Label = 'Medium'
RETURN ('Medium')
IF @inputscore < @MidPointStart
--SET @Label = 'Low'
RETURN ('Low')
RETURN (@Label)
```

While Table 2 provides an example technique for performing binning of privacy assessments, it is to be appreciated that other example techniques are contemplated, such as via an alternate programming language.

Upon processing the input data through the various modules, visualization module 122 can utilize the calculated privacy impact score to generate a visual depiction of the privacy impact score to an end user of the system by way of output 124. In some instances, output 124 may be a privacy report that is generated by the system and provided to a user, or output 124 may be a visualization of privacy impact presented by way of a display 126 having a graphical user interface (GUI), such as by way of an output produced on display 126 by visualization module 122.

As a result of processing the data associated with project 106, privacy impact metadata 128 may be generated that provides a record of the various data types processed, along with their uses and de-identification levels, which may be associated with a particular processing ID. The processing ID can be used to associate privacy impact metadata 128 with specific projects for later access, and the privacy impact metadata may be stored for safekeeping, such as by storing in a database of data processor 104. For example, in certain instances, a privacy officer for the organization may wish to revisit the privacy data associated with project 106, and can easily access such data by use of the processing ID associated with project 106.

Finally, there may be one or more external source(s) 130 that may be utilized by privacy impact model 114. For example, in calculating a privacy impact score, privacy impact module 116 may access certain third-party data that may be associated with project 106. For example, external source(s) 130 may include information pertaining to contractual obligations regarding the protection of certain types of PII that may be used by project 106. In this instance, privacy impact module 116 may access such contractual obligations data, which can result in a modification to the final privacy impact score due to the need for additional handling of PII data imposed by the contractual obligations. Alternatively, in some implementations, sensitivity normalization module 118 may provide normalization values that can be based on a number of legal, regulatory, and/or compliance factors that may be tailored to a particular organization or jurisdiction in which the organization operates. In this instance, sensitivity normalization module 118 may access external source(s) 130 to select the appropriate relative sensitivity scores to be applied as part of the normalization process.

Example User Experience

Figure 3:
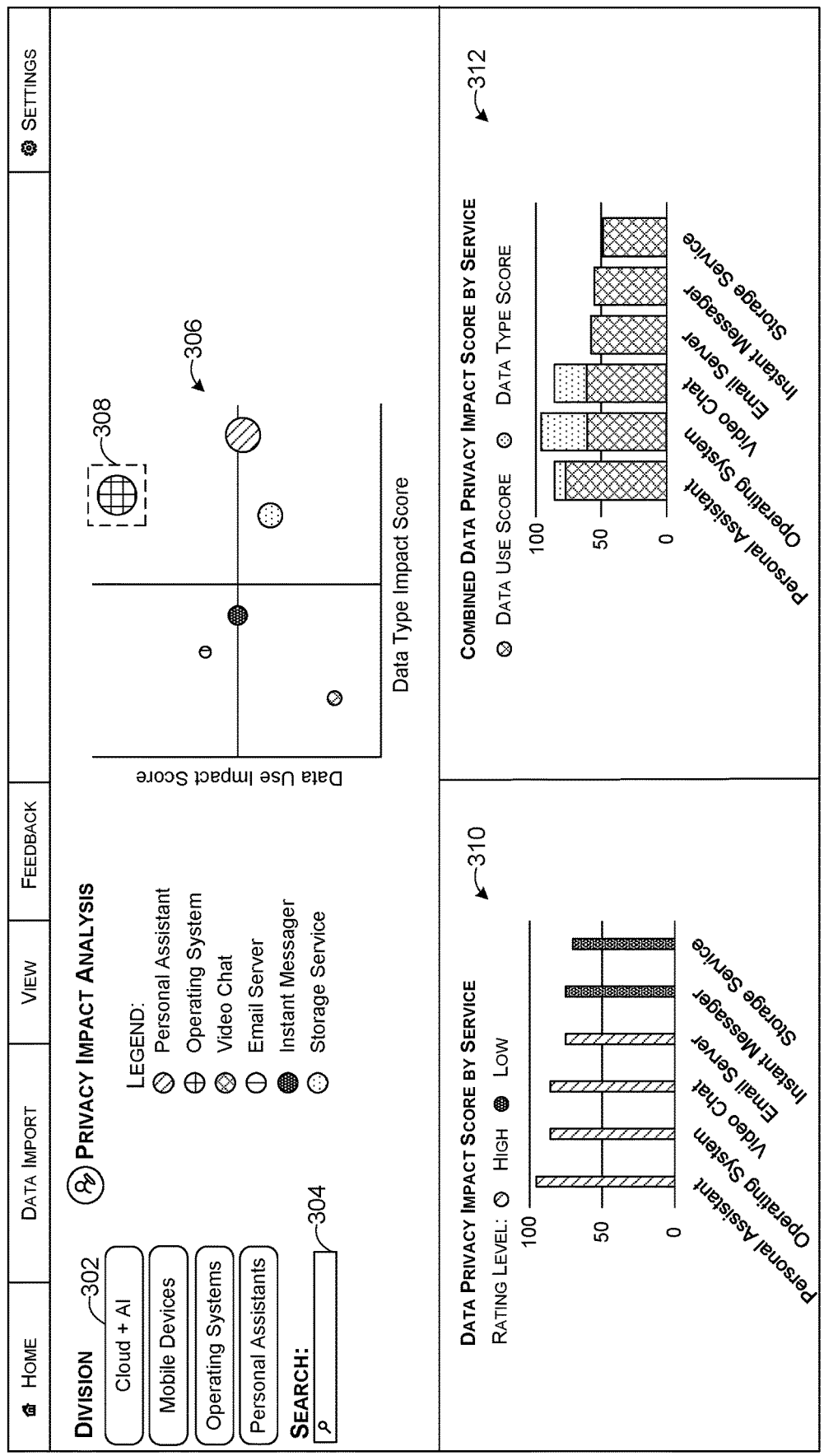
FIG. 3 illustrates an example graphical user interface that is consistent with some implementations of the present concepts

FIG. 3 depicts an example GUI 300 that can be caused to be shown on a display for purposes of visualizing the results from privacy impact model 114 based on processing by visualization module 122. GUI 300 illustrates various visualization examples relating to the privacy impact model. However, GUI 300 is illustrative in nature, and the features described herein may utilize alternative visualizations beyond those depicted by GUI 300.

Specifically, GUI 300 depicts an example user interface that can be used by a user to visualize privacy impact for certain projects and compare privacy scores across multiple projects and divisions within the organization. GUI 300 can include an organization division selection menu 302, where a user may select various divisions of the organization to visually compare privacy assessments for particular services or projects within the selected division. In some implementations, GUI 300 may retrieve data from the database associated with data processor 104, such as for accessing historic privacy assessments to compare new assessments against older assessments, or to compare against other projects or services. GUI 300 may also comprise a search tool 304, which can allow a user of GUI 300 to search for particular privacy assessments that may have been created in the past, or search for privacy assessments associated with particular projects or groups within the organization.

GUI 300 may also include one or more visual graphs, such as a privacy impact analysis graph 306, where privacy assessments for various services or projects associated with one or more divisions of the organization can be depicted for visual comparison. Specifically, privacy impact analysis graph 306 may utilize the aggregated scores that are calculated by privacy impact module 116 in plotting the privacy impact, where the aggregated data type impact score can be plotted on the X-axis, and the aggregated data use impact score can be plotted on the Y-axis. Furthermore, in some implementations, the privacy analysis results may influence the visual depiction, such as by influencing the size of the plot point on privacy impact analysis graph 306. For example, as depicted in GUI 300, the privacy impact for "Personal Assistant" is much higher than the privacy impact for "Video Chat," and as such, the plot point corresponding to "Personal Assistant" is generated as a larger plot point.

Furthermore, in some implementations, GUI 300 may also highlight a particular plot point on privacy impact analysis graph 306, such as depicted by plot point 308. Plot point 308 may be highlighted when, for example, the data use impact score and/or data type impact score exceed a certain threshold level set by the organization for privacy impact. Plot point 308 may additionally be selectable by a user of GUI 300, such as by selecting plot point 308 by way of a user selection using a cursor via GUI 300. Upon selection of plot point 308, GUI 300 may display information regarding the privacy impact for the service or project represented by the plot point, such as a suggestion or recommendation for reducing the privacy impact by anonymizing some of the data types.

GUI 300 may also include one or more optional visualizations, such as graphs 310 and 312, which can provide additional organizational visualizations for calculated privacy impact scores. For example, in graph 310, a bar graph can be utilized to visually compare data privacy impact scores by service within the organization, and the scores can be depicted differently depending on whether a given score falls within a high or low impact category, such as a category defined according to privacy binning module 120. Additionally, in graph 312, a bar graph can be utilized to visually compare the combined data use score and data type score between various services or projects within the organization.

Example Privacy Impact Calculation Method

Figure 4:
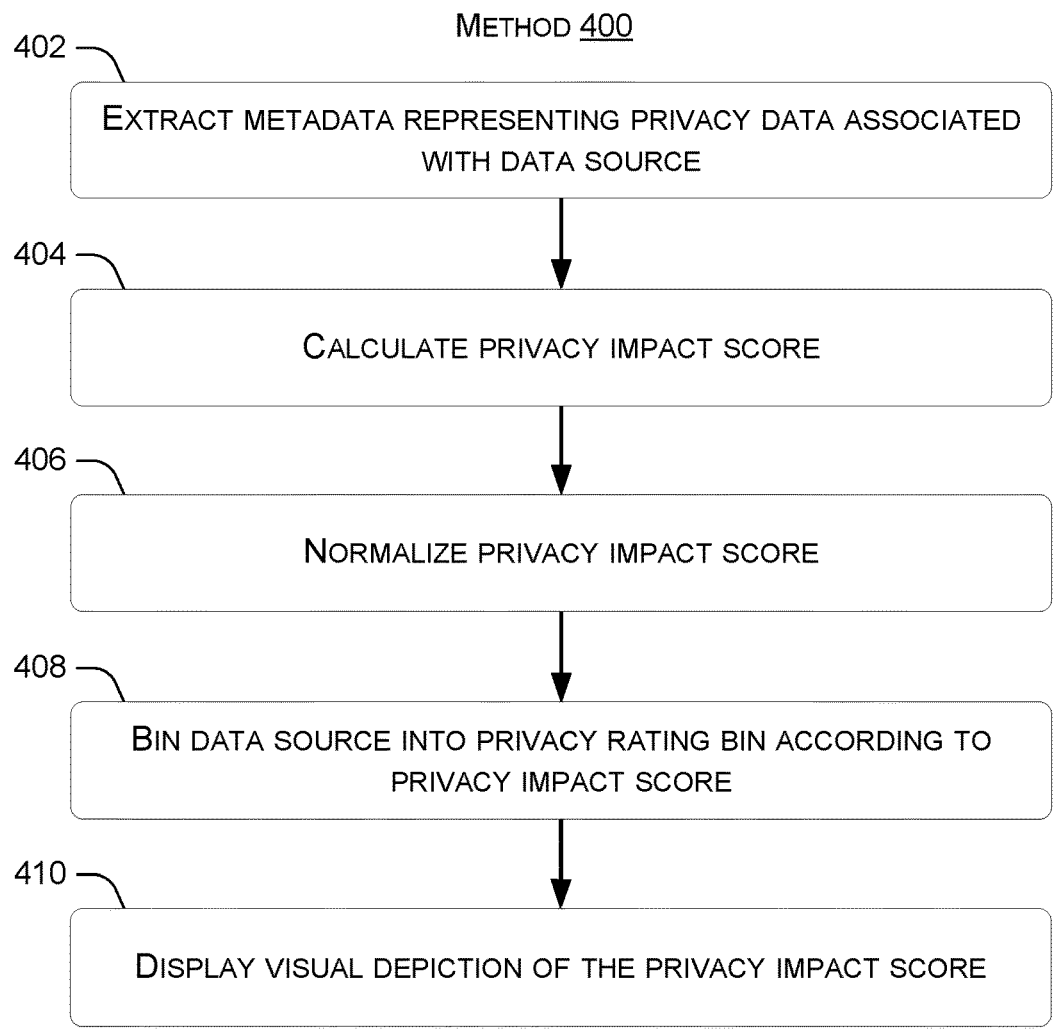
FIG. 4 illustrates an example method or technique that is consistent with some implementations of the present concepts.

The following discussion presents an overview of functionality that can provide a calculation of a privacy impact score for a given data source. FIG. 4 illustrates an example method 400, consistent with the present concepts. Method 400 can be implemented by a single device, e.g., privacy rating device 108, or can be distributed over one or more servers, client devices, etc. Moreover, method 400 can be performed by one or more modules, such as privacy impact module 116, sensitivity normalization module 118, privacy binning module 120, and visualization module 122.

At block 402, metadata associated with one or more data sources may be extracted. For example, data processor 104 may parse a data source, such as a software application, and may extract metadata associated with the parsed software application. Such metadata may include information about data types used in the software, data uses for the data types, and de-identification levels associated with the data types. The data types and uses may be based on established taxonomic structures, as set forth earlier. The metadata may then be stored in, for example, a database associated with data processor 104.

At block 404, privacy impact module 116 may calculate a privacy impact score based at least on the extracted metadata. The privacy impact score may be calculated using the extracted metadata, using the example techniques described earlier.

At block 406, sensitivity normalization module 118 may normalize the calculated privacy impact score to account for variations in sensitivity scores associated with the metadata. Furthermore, sensitivity normalization module 118 may access external source(s) 130 to further normalize the privacy impact score based on changes in legal or regulatory frameworks.

At block 408, privacy binning module 120 may bin the data source into a particular privacy rating bin according to the calculated privacy impact score. For example, privacy binning module 120 may bin data sources between high/medium/low bins, depending on the privacy impact score. The binning of data sources can provide an efficient means for grouping and aligning risk results across multiple systems within an organization.

Finally, at block 410, visualization module 122 may display a visual depiction of the privacy impact score on a graphical user interface. In some implementations, the visual depiction may be a privacy impact report that is generated and displayed to a user. Alternatively, the visual depiction may be an interface that depicts a number of graphs, which can plot privacy impact scores associated with one or more data sources, to allow a user to quickly ascertain the overall risk of multiple data sources to an organization.

Device Implementations

As noted above with respect to FIG. 1, system 100 may include several devices, including a data processor 104, and a privacy rating device 108. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc. For example, a "privacy impact system" can include one or more devices that perform privacy impact processing, such as processing performed by data processor 104, or privacy rating device 108.

Memory 112 can be storage resources that are internal or external to any respective devices with which it is associated. Memory 112 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 112.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices, such as IoT devices, that communicate over one or more network(s). Without limitation, such one or more network(s) can include one or more local area networks (LANs), wide area networks (WANs), the Internet, and the like.

Additional Examples

Various device examples are described above. Additional examples are described below. One example includes a system comprising a processor and a computer-readable storage medium storing instructions that, when executed by the processor, cause the system to: receive metadata representing privacy data from a data source, process, with a privacy model, the metadata to determine a privacy impact score associated with the data source, and generate a visual report depicting the privacy impact score on a user interface of the system.

Another example can include any of the above and/or below examples where the data source is a software application and the metadata is extracted from the software application.

Another example can include any of the above and/or below examples where the data source is a privacy impact assessment and the metadata is extracted from the privacy impact assessment.

Another example can include any of the above and/or below examples where the metadata includes taxonomies specifying data types, data usage of the data types, and de-identification levels of the data types.

Another example can include any of the above and/or below examples where the metadata further includes privacy sensitivity scores associated with the data types, the data usage of the data types, and the de-identification levels of the data types.

Another example can include any of the above and/or below examples where the sensitivity scores are weighted scores provided by an organization.

Another example can include any of the above and/or below examples where the sensitivity scores are weighted scores that are weighted according to legal or regulatory frameworks.

Another example can include any of the above and/or below examples where the visual report depicts privacy assessments associated with one or more data sources on a graph of the user interface.

Another example can include any of the above and/or below examples where a plot point on the graph corresponds to an aggregated data type impact score and an aggregated data use impact score.

Another example can include any of the above and/or below examples where computer-readable instructions, when executed by the processor, further cause the processor to: receive a user selection on at least one plot point on the graph and display information regarding the data source associated with the plot point selected according to the user selection.

Another example can include any of the above and/or below examples where computer-readable instructions, when executed by the processor, further cause the processor to provide a recommendation regarding reducing the privacy impact score associated with the data source.

Another example includes a method comprising extracting metadata representing privacy data utilized by a data source from a database, the metadata defining data types, data uses of the data types, and de-identification levels of the data types, calculating a privacy impact score based at least on the metadata, binning the data source into privacy rating bins according to the calculated privacy impact score, and displaying on a graphical user interface visual depictions of the calculated privacy impact score according to the privacy rating bins.

Another example can include any of the above and/or below examples where the method further comprises normalizing the privacy impact score based at least on previously calculated privacy impact scores.

Another example can include any of the above and/or below examples where the visual depiction of the calculated privacy impact is a visual graph with plot points depicting privacy impact scores of one or more data sources.

Another example can include any of the above and/or below examples where the method further comprises receiving a selection of a plot point associated with one of the data sources depicted on the visual graph and displaying information associated with the selected plot point.

Another example can include any of the above and/or below examples where the privacy impact score is calculated based on aggregating scores associated with the data types, and aggregating scores associated with the data uses of the data types.

Another example includes a system comprising a display of the system configured to depict a graphical user interface, a processor, and a storage memory storing computer-readable instructions, which when executed by the processor, cause the processor to: display, via the graphical user interface, data associated with privacy ratings for one or more data sources, receive a selection of at least one plot point representing a privacy impact score on the graphical user interface, determine whether a modification to metadata associated with the privacy impact score results in a reduction of the privacy impact score, and display a recommendation on the graphical user interface concerning the modification.

Another example can include any of the above and/or below examples where the privacy impact score is calculated based at least on aggregating sensitivity scores associated with data types used in a data source, and aggregating sensitivity scores associated with data uses of the data types used in the data source.

Another example can include any of the above and/or below examples where the privacy impact score is based at least on a de-identification level associated with the data types used in the data source.

Another example can include any of the above and/or below examples where a size of a plot point displayed on the graphical user interface is influenced by the privacy impact score.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
a processor; and
a computer-readable storage medium storing instructions that,
when executed by the processor, cause the system to:
receive metadata representing privacy data from a plurality of data sources, the metadata including taxonomies specifying data types and data uses of the data types, the metadata including weighted privacy sensitivity scores associated with the data types and the data uses;
determine, using a privacy model, a plurality of privacy impact scores associated with the plurality of data sources based at least on the metadata, the privacy model being configured to tune the weighted privacy sensitivity scores;
generate a visual report including a plot graph depicting a visual comparison of the plurality of privacy impact scores associated with the plurality of data sources on a user interface, the plot graph including a first axis representing a data type impact score and a second axis representing a data use impact score;
receive a selection of a particular plot point associated with a particular data source on the plot graph; and
cause the user interface to display a recommendation on how to modify the metadata and reduce a particular privacy impact score associated with the particular data source.

2. The system of claim 1, wherein the plurality of data sources include a software application and the metadata is extracted from at least the software application.

3. The system of claim 1, wherein the plurality of data sources include a privacy impact assessment and the metadata is extracted from at least the privacy impact assessment.

4. The system of claim 1, wherein the weighted privacy sensitivity scores are weighted by an organization.

5. The system of claim 1, wherein the weighted privacy sensitivity scores are weighted according to legal or regulatory frameworks.

6. The system of claim 1, wherein the particular plot point on the plot graph corresponds to an aggregated data type impact score and an aggregated data use impact score associated with the particular data source.

7. The system of claim 1, wherein the recommendation includes using an alternative data type instead of a particular data type of the particular data source.

8. The system of claim 1, wherein the taxonomies specify de-identification levels of the data types.

9. A method comprising:
extracting metadata representing privacy data utilized by a plurality of data sources, the metadata including taxonomies defining data types and data uses of the data types, the metadata including privacy sensitivity scores associated with the data types and the data uses;
calculating a plurality of privacy impact scores associated with the plurality of data sources based at least on the metadata;
binning the plurality of data sources into privacy rating bins according to the plurality of privacy impact scores;

causing a graphical user interface to display a bar graph depicting a visual comparison of the plurality of privacy impact scores associated with the plurality of data sources;

receiving a selection of a particular bar associated with a particular data source on the bar graph; and causing the graphical user interface to display a recommendation on how to modify the metadata and reduce a particular privacy impact score associated with the particular data source.

10. The method of claim 9, further comprising normalizing the plurality of privacy impact scores based at least on previously calculated privacy impact scores.

11. The method of claim 9, wherein the bar graph includes a plurality of bars depicting the plurality of privacy impact scores of the plurality of data sources.

12. The method of claim 9, wherein calculating the plurality of privacy impact scores comprises:

aggregating the privacy sensitivity scores associated with the data types; and aggregating the privacy sensitivity scores associated with the data uses.

13. The method of claim 9, wherein the recommendation includes anonymizing a particular data type of the particular data source or de-identifying the particular data type.

14. The method of claim 9, wherein the taxonomies define de-identification levels of the data types, and the privacy sensitivity scores are associated with the de-identification levels.

15. A system comprising:

a processor; and a storage memory storing computer-readable instructions, which when executed by the processor, cause the processor to:

cause a graphical user interface to display a plot graph depicting a visual comparison of a plurality of privacy impact scores associated with a plurality of data sources, the plurality of privacy impact scores being based on metadata representing privacy data from the plurality of data sources, the metadata including weighted privacy impact sensitivity scores associated with data types and data uses, the plot graph including a first axis representing a data type impact score and a second axis representing a data use impact score;

receive a selection of a particular plot point representing a particular privacy impact score associated with a particular data source on the plot graph via the graphical user interface;

determine how to modify the metadata to reduce the particular privacy impact score; and cause a recommendation to be displayed on the graphical user interface on how to modify the metadata and reduce the particular privacy impact score associated with the particular data source.

16. The system of claim 15, wherein:

the metadata includes taxonomies specifying the data types, the data uses of the data types, and de-identification levels of the data types; and the plurality of privacy impact scores are calculated based at least on aggregating sensitivity scores associated with the data types and aggregating sensitivity scores associated with the data uses.

17. The system of claim 15, wherein sizes of a plurality of plot points in the plot graph displayed on the graphical user interface are influenced by the plurality of privacy impact scores.

18. The system of claim 15, wherein the computer-readable instructions further cause the processor to:

implement the recommendation by modifying the metadata to reduce the particular privacy impact score.

19. The system of claim 18, wherein implementing the recommendation by modifying the metadata includes anonymizing a particular data type associated with the particular data source to reduce the particular privacy impact score.

20. The system of claim 15, wherein the recommendation includes using an alternative data type instead of a particular data type of the particular data source.

* * * * *